United States Patent
Bedard et al.

(10) Patent No.: US 8,695,744 B1
(45) Date of Patent: Apr. 15, 2014

(54) THROTTLE LEVER FOR A SNOWMOBILE

(75) Inventors: Yvon Bedard, Orford (CA); Rene Lemieux, Granby (CA)

(73) Assignee: Bombardier Recreational Products Inc., Valcourt (CA)

( * ) Notice: Subject to any disclaimer, the term of this patent is extended or adjusted under 35 U.S.C. 154(b) by 10 days.

(21) Appl. No.: 13/112,060

(22) Filed: May 20, 2011

Related U.S. Application Data

(60) Provisional application No. 61/349,512, filed on May 28, 2010.

(51) Int. Cl.
  *B62M 27/02* (2006.01)
(52) U.S. Cl.
  USPC ............ 180/190; 180/9.1; 180/316; 180/335; 74/479
(58) Field of Classification Search
  USPC ................... 180/9.1, 316, 335, 190; 74/479
  See application file for complete search history.

(56) References Cited

U.S. PATENT DOCUMENTS

| | | | | |
|---|---|---|---|---|
| 3,954,151 A | * | 5/1976 | Budzich et al. | 180/271 |
| 4,213,513 A | * | 7/1980 | Beck | 180/272 |
| 4,619,341 A | * | 10/1986 | Davis | 180/335 |
| 4,875,386 A | * | 10/1989 | Dickerson | 74/551.9 |
| 5,775,167 A | * | 7/1998 | Maietta | 74/480 R |
| 6,363,812 B1 | * | 4/2002 | Yamamura | 74/551.8 |
| 6,551,153 B1 | * | 4/2003 | Hattori | 440/87 |
| 6,658,965 B2 | * | 12/2003 | Allen | 74/526 |
| 8,082,819 B2 | * | 12/2011 | Case et al. | 74/501.6 |
| 2004/0163485 A1 | * | 8/2004 | Ginnetti | 74/488 |
| 2009/0107280 A1 | * | 4/2009 | Case et al. | 74/480 R |
| 2009/0183587 A1 | * | 7/2009 | Amce | 74/489 |

OTHER PUBLICATIONS

Fullthrottle Inc. [online], 2013, [retrieved on Jul. 29, 2013]. Retrieved from the Internet: < URL:http://www.fullthrottleinc.com/Goldfinger_for_Snowmobile_p/1.htm>.
Fullthrottle Inc. [online], 2013, [retrieved on Jul. 29, 2013]. Retrieved from the Internet: <http://www.fullthrottleinc.com/Goldfinger_for_ATV_p/2.htm>.
Fullthrottle Inc. [online], 2013, [retrieved on Jul. 29, 2013]. Retrieved from the Internet: <http://www.fullthrottleinc.com/aboutus.asp>.

* cited by examiner

*Primary Examiner* — Joseph M Rocca
*Assistant Examiner* — Marlon Arce
(74) *Attorney, Agent, or Firm* — BCF LLP

(57) ABSTRACT

A snowmobile has a frame, a tunnel, an endless drive track, at least one ski, an engine, a handlebar being pivotable about a steering axis, a first throttle lever pivotably connected to the handlebar and operatively connected to the engine, the first throttle lever being disposed on a first side of the steering axis, and a second throttle lever pivotably connected to the handlebar and operatively connected to the engine, the second throttle lever being disposed on a second side of the steering axis. A throttle lever assembly is also disclosed.

25 Claims, 10 Drawing Sheets

THROTTLE LEVER FOR A SNOWMOBILE

CROSS-REFERENCE

The present application claims priority to U.S. Provisional Patent Application No. 61/349,512, filed May 28, 2010, the entirety of which is incorporated herein by reference.

TECHNICAL FIELD

The present invention relates to snowmobiles and, more particularly, to throttle levers for snowmobiles.

BACKGROUND

Snowmobiles are often operated at high speeds and over rough terrain such as slopes and hills. In such conditions, it is especially important that a rider of a snowmobile be able to maintain effective control of the snowmobile.

When the rider of the snowmobile is crossing a slope, or making a high-speed turn, it is desirable for the rider to shift his weight on the snowmobile to lean uphill or into the turn as much as possible while maintaining effective control over the snowmobile. These positions are also referred to right side hilling or left side hilling depending on which side of the snowmobile the rider shifts his weight. To that end, mountain straps of various types have been devised that allow the rider to remove the downhill or outside hand from the handlebar of the snowmobile and to put it on the strap in order to shift his weight as much as possible uphill or into the turn.

Under normal riding conditions the rider steers the snowmobile by grabbing grip portions located at each end of a handlebar. Adjacent to one of the grip portions, usually the grip portion on which the rider positions his right hand, is located a throttle lever that provides control to the rider over the load of the engine. Such throttle lever is usually referred to as a right throttle lever. An example of a right throttle lever can be found in U.S. Pat. No. 4,899,610, issued Feb. 13, 1990, the entirety of which is incorporated herein by reference. Under normal riding conditions, the right throttle lever is actuated by the right thumb of the rider while the other fingers of the same hand grasp the grip portion of the handlebar. The right throttle lever can also be activated by one or more fingers of the right hand when the rider is leaning toward the right side of the snowmobile with his left hand on the left handle or on the mountain strap.

While the right throttle lever mentioned above is well suited for straight ahead driving on level ground, right turns, left turns and also for right side hilling, it is not well located for the driver to actuate it during left side hilling (i.e. when the rider is leaning toward the left side of the snowmobile). When such a situation arises, the rider must either compromise his stance by leaning only as far as his reach will allow him or tilt the snowmobile into the slope so that the snowmobile and rider are generally horizontal and the rider once again has sufficient reach to operate the right throttle lever since the rider must keep his right hand on the right throttle lever. Further, mountains straps, although designed to improve control during such situations do not completely overcome the problem during left side hilling. Since the rider must keep one hand on the right side of the handlebar to actuate the right throttle lever, the driver can only use his left hand to grab the mountain strap thereby limiting him in positioning his body toward the left side of the snowmobile.

In an attempt to address this problem, additional throttle levers to be installed on the left side of the handlebar have been devised. Such additional throttle levers are usually referred to as left throttle levers, by opposition to the right throttle levers that are usually installed on the snowmobile by default. A typical left throttle lever comprises a lever pivotally mounted on a housing to be installed on the handlebar of the snowmobile. When installed, the lever extends from its pivot point toward the left of the snowmobile, generally symmetrically with the lever of the right throttle lever with respect to the steering axis of the snowmobile. While left throttle levers address partially the problem of left side hilling, they still present several drawbacks.

Because a brake lever is usually located on the left side of the handlebar, the place to position the left throttle lever is limited and causes inconveniences while riding the snowmobile under normal conditions during which the left throttle lever is not needed. In addition, because the left throttle lever and the brake lever are designed to both be actuated by the left hand, it can be difficult for the rider to activate both with the same hand. Also, the design of the left throttle lever is such that the rider has to grab the mountain strap with the right hand and control the left throttle lever with the left hand when left side hilling.

Therefore, there is a need for a throttle lever for a snowmobile that allows good control of snowmobiles during side hilling while not compromising riding of the snowmobile under normal conditions.

SUMMARY

Example embodiments of a throttle lever assembly according to the present invention ameliorate at least some of the inconveniences present in the prior art.

An example embodiment of a snowmobile has a frame, a tunnel, an endless drive track, at least one ski, an engine, a handlebar being pivotable about a steering axis, a first throttle lever pivotably connected to the handlebar and operatively connected to the engine, the first throttle lever being disposed on a first side of the steering axis, and a second throttle lever pivotably connected to the handlebar and operatively connected to the engine, the second throttle lever being disposed on a second side of the steering axis.

In one aspect, a mountain strap is connected to the handlebar and the second throttle lever can be actuated while holding the mountain strap.

An example embodiment of a throttle lever assembly has a housing having an opening adapted for receiving a handlebar of a vehicle. The opening defines a central axis. A lever is pivotally connected to the housing. The throttle lever is movable between a first position and a second position. The throttle lever is normally biased toward the first position. The throttle lever is generally perpendicular to the central axis when in the first position.

For purposes of this application, terms related to spatial orientation such as forwardly, rearwardly, left, and right, are as they would normally be understood by a driver of the snowmobile sitting thereon in a normal riding position.

Also for purposes of this application, the direction of rotation of a lever connected to the handlebar should be understood with respect to the direction in which the lever extends from its pivot point with reference to a vertical plane passing through a central axis of the portion of the handlebar to which the lever is connected. A lever extending rearwardly of the vertical plane is said to rotate counter-clockwise when it is pivoted toward the handlebar by moving it generally toward the right side of the snowmobile. A lever extending rearwardly of the vertical plane is said to rotate clockwise when it is pivoted toward the handlebar by moving it generally toward the left side of the snowmobile. A lever extending forwardly of the vertical plane is said to rotate clockwise when it is pivoted toward the handlebar by moving it generally toward the right side of the snowmobile. A lever extending forwardly of the vertical plane is said to rotate counter-clockwise when it is pivoted toward the handlebar by moving it generally toward the left side of the snowmobile.

Additional and/or alternative features, aspects, and advantages of embodiments of the vehicle transmission will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION

Figure 1:
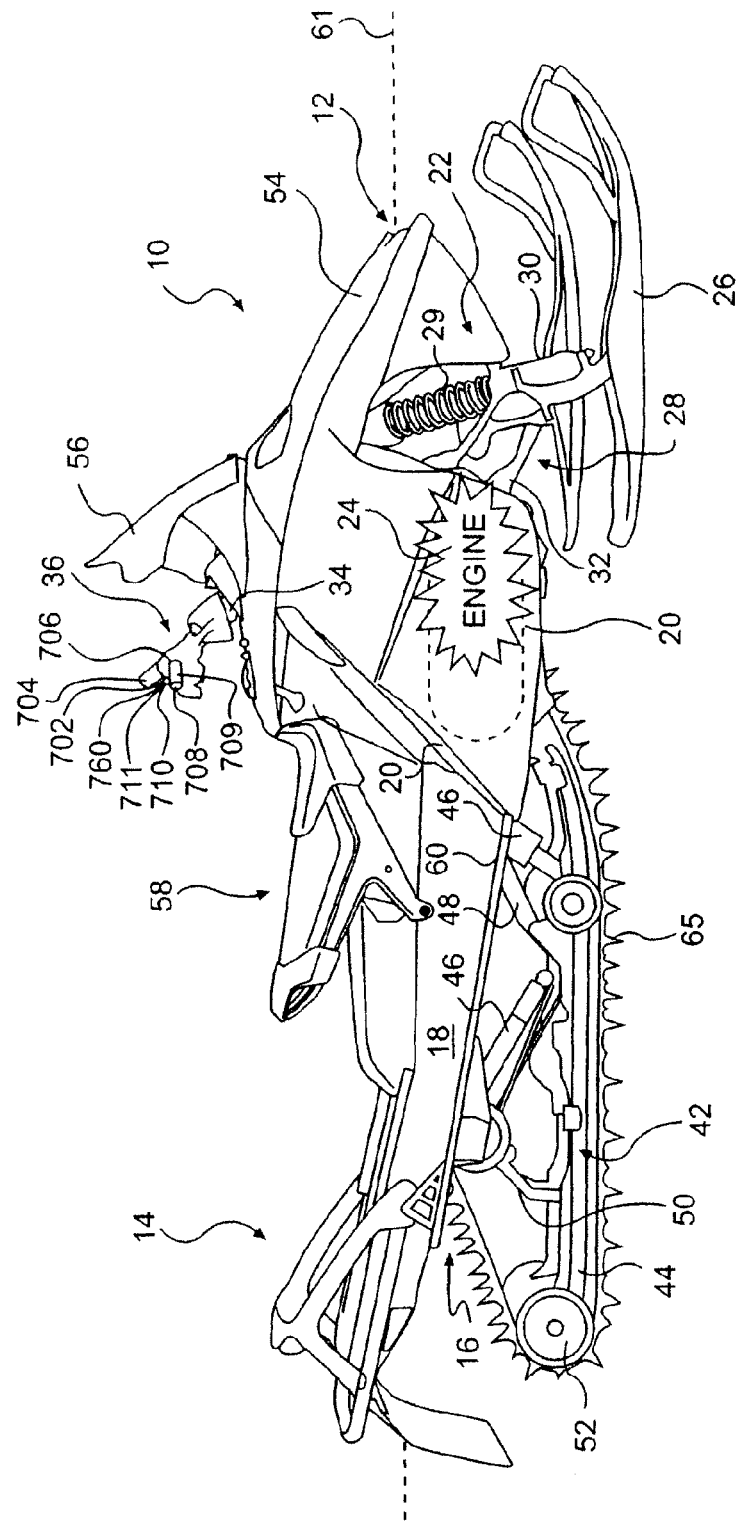
FIG. 1 is a right side elevation view of a snowmobile.

FIG. 1 illustrates a snowmobile 10 including a forward end 12 and a rearward end 14 which are defined consistently with a travel direction of the snowmobile 10. The snowmobile 10 includes a frame 16 which includes a tunnel 18 and an engine compartment 20. A front suspension 22 is connected to the frame. The tunnel 18 generally consists of one or more pieces of sheet metal bent to form an inverted U-shape. The tunnel 18 extends rearwardly along the longitudinal centerline 61 of the snowmobile 10 and is connected at the front to the engine compartment 20. An engine 24, which is schematically illustrated in FIG. 1, is carried by the engine compartment 20 of the frame 16. A steering assembly (not indicated) is provided, in which two skis 26 are positioned at the forward end 12 of the snowmobile 10 and are attached to the front suspension 22 through a pair of front suspension assemblies 28. Each front suspension assembly 28 includes a ski leg 30, a pair of A-arms 32 and a shock absorber 29 for operatively connecting the respective skis 26 to a steering column 34. Other types of front suspension assemblies 28 are contemplated, such as a swing-arm or a telescopic suspension. A handlebar 36, positioned forward of a rider, is attached to the upper end of the steering column 34 to allow the rider to rotate the ski legs 30 and thus the skis 26, in order to steer the snowmobile 10. The handlebar 36 symmetrically extends into a right end 708 and a left end 710 with respect to the steering column toward a right side and a left side respectively of the snowmobile 10 and rotates about a steering axis SA. A grip portion 709 is disposed on the right end 708. A grip portion 711 is disposed on the left end 710. A mountain strap 704 extending upwardly from the handlebar 36 is attached to the handlebar 36 centrally thereon. A right throttle lever assembly 706 is positioned adjacent to the grip portion 709. The snowmobile 10 has a left throttle lever assembly 702 positioned adjacent to the grip portion 711. The right throttle lever assembly 706 and the left throttle lever assembly 702 are operatively connected to the engine 24. A brake assembly 760 is also attached to the handlebar 36 near the grip portion 711.

An endless drive track 65 is positioned at the rear end 14 of the snowmobile 10. The endless drive track 65 is disposed generally under the tunnel 18, and is operatively connected to the engine 24. The endless drive track 65 is driven to run about a rear suspension assembly 42 for propelling the snowmobile 10. The rear suspension assembly 42 includes a pair of slide rails 44 in sliding contact with the endless drive track 65. The rear suspension assembly 42 also includes one or more shock absorbers 46 which may further include a coil spring (not shown) surrounding the individual shock absorbers 46. Suspension arms 48 and 50 are provided to attach the slide rails 44 to the frame 16. One or more idler wheels 52 are also provided in the rear suspension assembly 42.

At the front end 12 of the snowmobile 10, fairings 54 enclose the engine 24, thereby providing an external shell that not only protects the engine 24, but can also be shaped to make the snowmobile 10 more aesthetically pleasing. Typically, the fairings 54 include a hood (not indicated) and one or more side panels which can be opened to allow access to the engine 24 when this is required, for example, for inspection or maintenance of the engine 24. In the particular snowmobile 10 shown in FIG. 1, the side panels can be opened along a vertical axis to swing away from the snowmobile 10. A windshield 56 is connected to the fairings 54 near the front end 12 of the snowmobile 10. Alternatively the windshield 56 can be connected directly to the handlebar 36. The windshield 56 acts as a wind screen to lessen the force of the air on the rider while the snowmobile 10 is moving.

A straddle-type seat 58 is positioned atop the frame 16. A rear portion of the seat 58 may include a storage compartment or can be used to accommodate a passenger seat (not indicated). Two footrests 60 are positioned on opposite sides of the snowmobile 10 below the seat 58 to accommodate the driver's feet.

Figure 2:
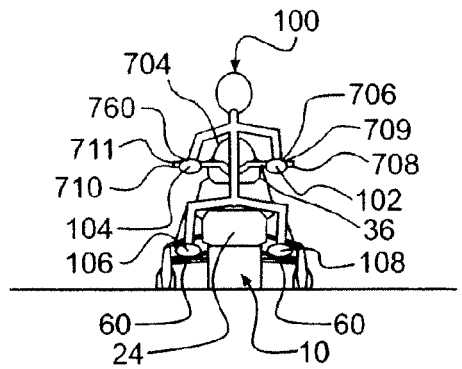
FIG. 2 is a schematic representation of a rider on the snowmobile in a first riding position taken from the rear of the snowmobile.

FIG. 2 schematically illustrates a rider 100 of the snowmobile 10 in a standard riding position (e.g. straight ahead driving). The rider 100 is aligned with the snowmobile 10. The rider 100 steers the snowmobile 10 by grabbing the grip portion 709 of the right end 708 and the grip portion 711 of the left end 710 of the handlebar 36 with his right 102 and left 104 hands respectively. The right 108 and left 106 feet of the rider 100 are positioned on the right and left footrests 60 respectively. In this position, the rider 100 controls the load of the engine 24 by actuating the right throttle lever assembly 706 with the right hand 102, and more specifically with the thumb. The rider 100 controls a brake mechanism 760 of the snowmobile 10 by actuating the brake assembly 760 with one or more fingers of the left hand 104.

Figure 3:
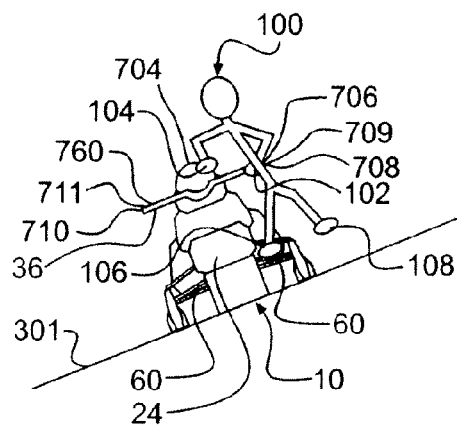
FIG. 3 is a schematic representation of a rider on the snowmobile in a second riding position taken from the rear of the snowmobile.

FIG. 3 schematically illustrates the rider 100 leaning toward the right side of the snowmobile 10 (i.e. in a right side hilling position). The weight of the rider 100 is shifted toward an uphill direction of a slope 301. The rider 100 grabs the mountain strap 704 with the left hand 104 and the grip portion 709 of the right end 708 of the handlebar 36 with the right hand 102. The left foot 106 of the rider 100 is positioned on the right footrest 60. In this position, the rider 100 controls the load of the engine 24 by actuating the right throttle lever 706 with the right hand 102.

Figure 4:
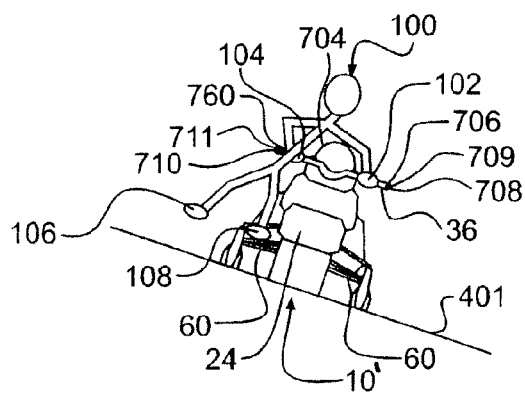
FIG. 4 is a schematic representation of a rider on a snowmobile without a left throttle lever in a third riding position taken from the rear of the snowmobile.

FIG. 4 schematically illustrates the rider 100 leaning toward the left side of a prior art snowmobile 10' (i.e. in a left side hilling position) that does not have the left throttle lever 702 of the present snowmobile 10. The weight of the rider 100 is shifted toward an uphill direction of a slope 401. The rider 100 grabs the grip portion 711 of the left end 710 of the handlebar 36 or the mountain strap 704 with the left hand 104. The rider 100 positions the right hand 102 on the grip portion 709 of the right end 708 in order to control the load of the engine 24 by actuating the right throttle lever 706. The right foot 108 of the rider 100 is positioned on the left footrest 60. Alternatively, both feet 106, 108 of the rider 100 could be positioned on the left footrest 60, or only the left foot 106 of the rider 100 could be positioned on the left footrest 60 with the right foot 108 being on the seat 58 for example. In this position, because the right hand 102 remains on the right end 708 of the handlebar 36, the rider 100 is limited in positioning the upper part of his body toward the left side of the snowmobile 10'.

Figure 5:
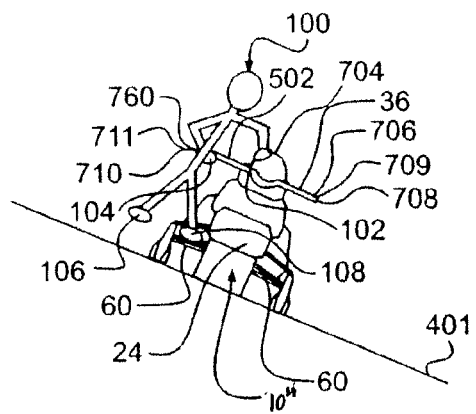
FIG. 5 is a schematic representation of a rider on a snowmobile having a prior art left throttle lever in a fourth riding position taken from the rear of the snowmobile.

FIG. 5 schematically illustrates the rider 100 leaning toward the left side of another prior art snowmobile 10" (i.e. in a left side hilling position) that has a prior art left throttle lever 502 such as the one described in the background section of the present application instead of the left throttle lever 702 of the present snowmobile 10. The left throttle lever 502 is basically a mirror image of the right throttle lever 706 and as such is best suited to be actuated by a left hand, and more specifically a left thumb, of the rider. The weight of the rider 100 is shifted toward the uphill direction of the slope 401. The rider 100 grabs the mountain strap 704 with the right hand 102. The right foot 108 of the rider 100 is positioned on the left footrest 60. Alternatively, both feet 106, 108 of the rider 100 could be positioned on the left footrest 60, or only the left foot 106 of the rider 100 could be positioned on the left footrest 60 with the right foot 108 being on the seat 58 for example. Because the left throttle lever 502 is to be actuated by the left hand 104, the rider 100 is also limited in positioning the upper part of his body toward the left side of the snowmobile 10".

Figure 6:
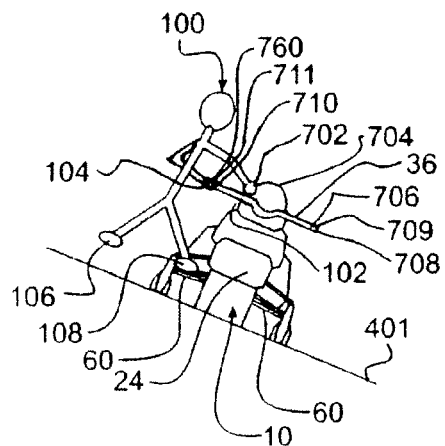
FIG. 6 is a schematic representation of a rider on the snowmobile of FIG. 1 in a fifth riding position taken from the rear of the snowmobile.

FIG. 6 schematically illustrates the rider 100 leaning toward the left side of the snowmobile 10 (i.e. in a left side hilling position) that is provided with the left throttle lever 702. The weight of the rider 100 is shifted toward the uphill direction of the slope 401. The right foot 108 of the rider 100 is positioned on the left footrest 60. Alternatively, both feet 106, 108 of the rider 100 could be positioned on the left footrest 60, or only the left foot 106 of the rider 100 could be positioned on the left footrest 60 with the right foot 108 being on the seat 58 for example. In this example, the left throttle lever assembly 702 is positioned between the left end 710 and the mountain strap 704. The rider 100 grabs the mountain strap 704 with the right hand 102 while actuating the left throttle lever assembly 702 with the thumb of the right hand 102. Because the rider 100 can grab both the mountain strap 704 and actuate the left throttle lever assembly 702 with the right hand 102, the left hand 104 remains free to actuate the brake assembly 760 when required and can be moved further left on the grip portion 711. This allows the rider 100 to position the upper part of his body further toward the left side of the snowmobile 10 compared to the prior art examples shown in FIGS. 4 and 5.

Figure 7:
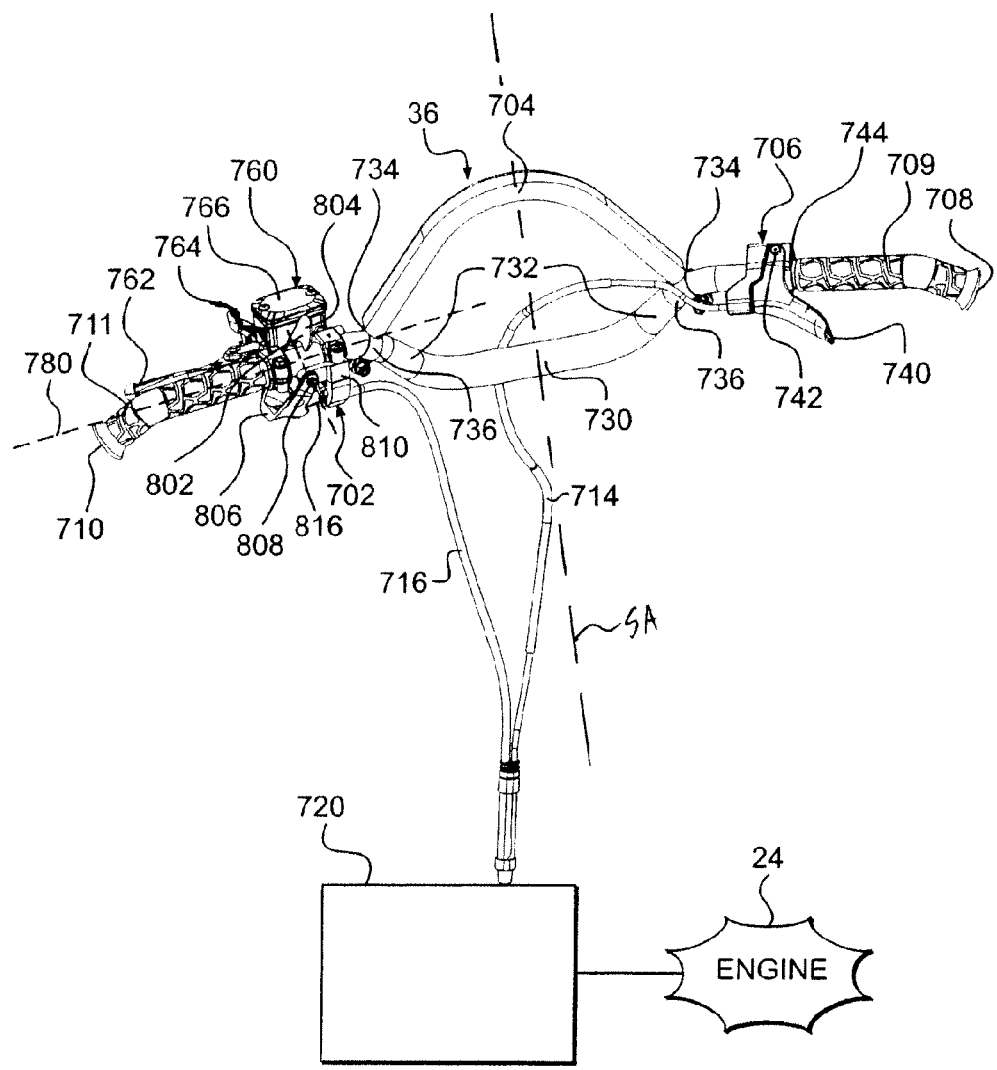
FIG. 7 is a rear, left perspective view of a handlebar assembly of the snowmobile of FIG. 1.

FIG. 7 illustrates the handlebar 36 of the snowmobile 10. The handlebar 36 is formed from steel or aluminum tubing having a circular cross-section. It is contemplated that the handlebar 36 could be made of other materials and could have a different cross-section. The handlebar 36 has a central mounting portion 730 for mounting to the steering column of the snowmobile 10. The handlebar 36 bends upwardly at each side of the central mounting portion 730 to form generally upward portions 732. From the upright portions 732, the handlebar 36 bends outwardly to form the right end 708 and the left end 710. The grip portions 709 and 711 are positioned at the right end 708 and at the left end 710 respectively. Curved portions 734 are formed at the transition between each upright portion 732 and the grip portions 709 and 711. The mountain strap 704 is connected to the handlebar 36 at the transition between each upright portion 732 and the grip portions 709 and 711. It is contemplated that the mountain strap 704 could be connected elsewhere on the handlebar 36. The mountain strap 704 extends upwardly from the handlebar 36 and is connected to the handlebar 36 by collars 736 on both sides of the steering axis SA. The collars 736 have an inner diameter adapted to receive the tubular handlebar 36. The collars 736 can be tightened to the handlebar 36 with a screw or a combination of a bolt and a nut for example. Alternatively, it is also contemplated that the mountain strap 704 could be connected to the handlebar 36 by other means, such as by welding or by forming the mountain strap 704 as an integral portion of the handlebar 36 for example.

The right throttle lever assembly 706 is mounted on the handlebar 36, between the grip portion 709 and the right collar 736 of the mountain strap 704. The right throttle lever assembly 706 has a lever 740 and a housing 744. The lever 740 is pivotably connected to the housing 744 about a pivot axis 742. The lever 740 extends from the pivot axis 742 toward the grip portion 709 and toward the rear of the snowmobile 10 for actuation by the right thumb of a rider of the snowmobile 10. The lever 740 is normally biased away from the handlebar 36 toward the position shown in FIG. 7 by a spring or other biasing means. The lever 740 pivots toward the handlebar 36 and toward a right side of the snowmobile 10 (i.e. in a counter-clockwise direction) upon applying a force toward the handlebar 36. The lever 740 is operatively connected to a first end of a cable. A second end of the cable is operatively connected to an air flow control mechanism 720 which controls a load of the engine 24. The air flow control mechanism 720 can be a carburetor or a throttle body, for example.

The lever 740 is pivotably connected to the handlebar 36 by the housing 744. The housing 744 comprises an inner diameter extending longitudinally and adapted to receive the tubular handlebar 36. The housing 744 can be tightened to the handlebar 36 with a screw or with a combination of a bolt and a nut for example. Alternatively, it is contemplated that the housing 744 could be connected to the handlebar 36 by other means, such as by welding for example. The housing 744 is connected to a first end of a cable sheath 714 inside which the cable connected to the lever 740 translates upon actuation of the lever 714. A second end of the cable sheath 714 is connected to the air flow control mechanism 720.

The brake control assembly 760 is connected to the handlebar 36, between the grip portion 711 and the left collar 736 of the mountain strap 704. The brake control assembly 760 has a lever 762, a housing 764 and a brake master cylinder 766. The lever 762 is pivotably connected to the housing 764 about a pivot axis (not shown). The lever 762 extends from the pivot axis toward the grip portion 711 and toward the front of the snowmobile 10 for actuation by the left hand of the rider of the snowmobile 10. The lever 762 is normally biased away from the handlebar 36 by a spring or other biasing means. The lever 762 pivots toward the handlebar 36 (i.e. in a counter-clockwise direction) upon applying a force toward the handlebar 36 so as to actuate the braking system of the snowmobile 10 (not shown). The lever 762 is operatively connected to the brake master cylinder 766. The brake master cylinder 766 is fluidly connected to the brake system of the snowmobile 10.

The lever 762 is pivotably connected to the handlebar 36 by the housing 764. The housing 764 has an inner diameter adapted to receive the tubular handlebar 36. The housing 764 can be tightened to the handlebar 36, for example, with a screw or with a combination of a bolt and a nut. Alternatively, it is contemplated that the housing 764 could be connected to the handlebar 36 by other means, such as by welding for example.

Although a brake system using a hydraulic system is depicted, it is contemplated that a mechanical system (e.g. based on cables) or an electric system (e.g. a drive-by-wire system) can be used to operatively connect the lever 762 of the brake assembly 760 to the brake system of the snowmobile 10.

The left throttle lever assembly 702 is connected to the handlebar 36, between the grip portion 711 and the left collar 736 of the mountain strap 704. The left throttle lever assembly 702 has a lever 802 pivotably connected to the handlebar 36 by a housing 810. The lever 802 pivots about a pivot axis 808. The lever 802 is normally biased away from the handlebar 36 toward the position shown in FIG. 8 by a spring or other biasing means. The lever 802 pivots toward the mountain strap 704 and toward the right side of the snowmobile 10 (i.e. in a counter-clockwise direction) upon applying a force toward the handlebar 36. The lever 802 comprises a top portion 804 and a bottom portion 806. The top portion 804 extends generally vertically above a central axis 780 of the grip portion 711 generally parallel to the mountain strap 704 and is connected to the bottom portion 806. As can be seen, the portion of the lever 802 connecting the top portion 804 to the bottom portion 806 extends in front on the handlebar 36, but it is contemplated that it could extend behind the handlebar 36. The bottom portion 806 extends vertically below the central axis 780 of the grip portion 711. It is also contemplated that the lever 802 can be disposed rearwardly or forwardly of the handlebar 36 to match other possible positions of the mountain strap 704. The bottom portion 806 is operatively connected to a first end of a cable 816. A second end of the cable 816 is operatively connected to the air flow control mechanism 720. The housing 764 is connected to a first end of a cable sheath 716 inside which the cable 816 translates upon actuation of the lever 802. A second end of the cable sheath 716 is connected to the air flow control mechanism 720.

Although, a second end of the cable 816 connected to the air flow control mechanism 720 is depicted, it also contemplated that the second end of the cable 816 could alternatively be connected to the right throttle lever assembly 706 such that both throttle lever assemblies are actuated together or to the cable connected to the right throttle lever 706.

Although a mechanism based on a combination of cables with the cable sheaths 714 and 716 to actuate the air flow control mechanism 720 is recited, it is contemplated that a hydraulic system or an electric system (e.g. a drive-by wire-system) could be used to operatively connect the right throttle lever assembly 706 and/or the left throttle lever assembly 702 to the air flow control mechanism 720.

Figure 8:
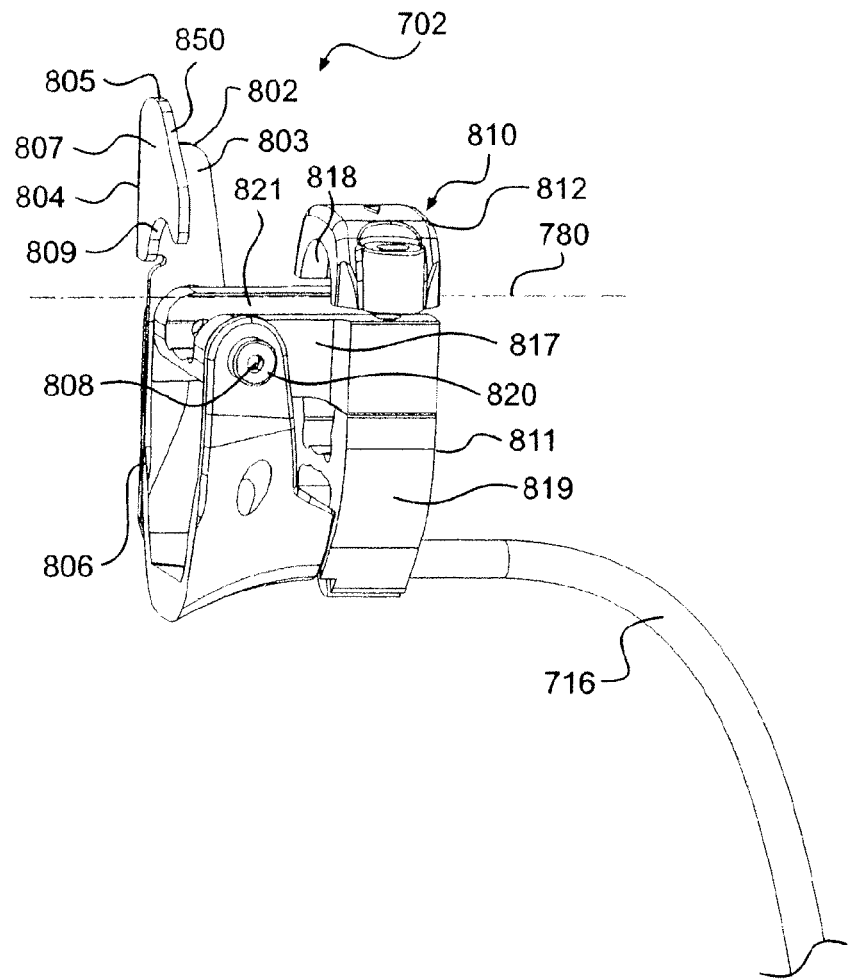
FIG. 8 is a rear, left perspective view of a left throttle lever assembly of the handlebar assembly of FIG. 7.
Figure 9:
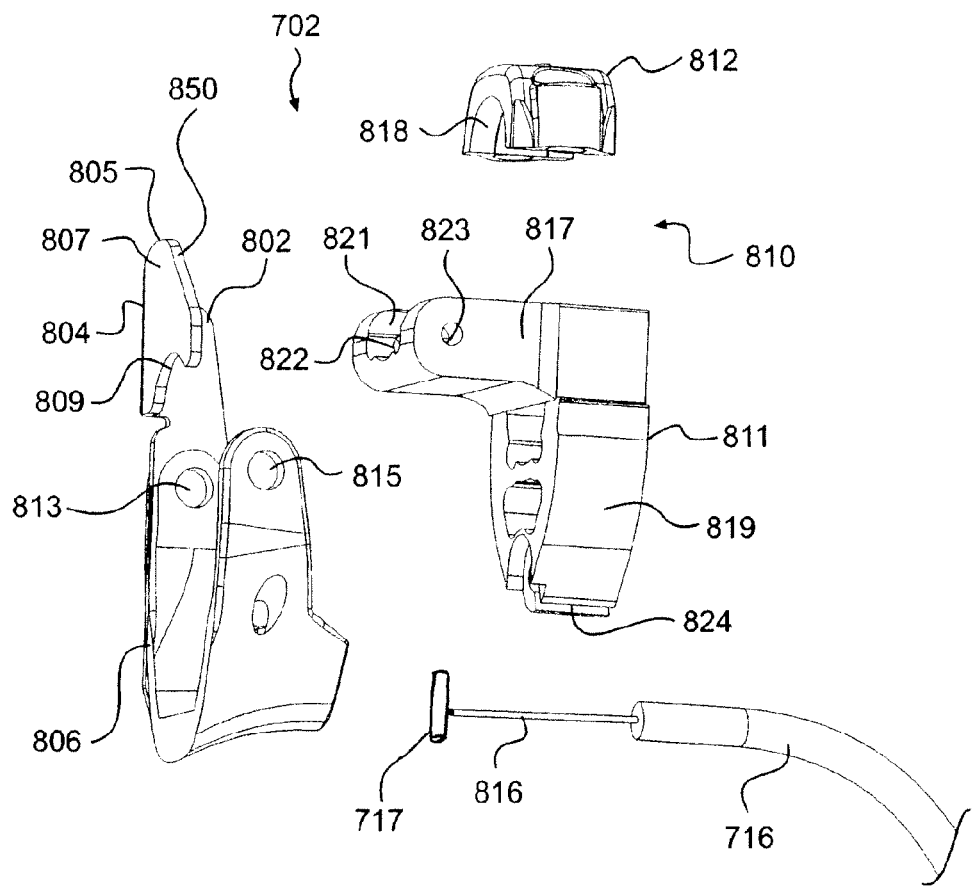
FIG. 9 is an exploded view of the left throttle lever assembly of FIG. 8.

Turning now to FIGS. 8 and 9, details of the left throttle lever assembly 702 will be described. In this embodiment, the top portion 804 and the bottom portion 806 are integrally formed from steel, aluminum or plastic. It is contemplated that the top and bottom portions 804, 806 could be made of other materials. The top portion 804 and the bottom portion 806 can also be formed of elements attached or welded together. The top portion 804 and the bottom portion 806 pivot about the pivot axis 808. The top portion 804 and the bottom portion 806 are pivotably and removably connected to the housing 810 by a screw 820. The top portion 804 extends between the handlebar 36 and the brake master cylinder 766 when installed on the snowmobile 10. The top portion 804 has a portion 805 which extends perpendicularly to and from a portion 803 such that the portion 805 normally extends upwardly and generally perpendicularly to the handlebar 36 when installed on the snowmobile 10. The portion 805 comprises a surface 807 adapted for actuation of the lever 702 by a right thumb of the rider 100. The portion 805 also comprises a bevelled edge 850 and a recess 809. The bevelled edge 850 facilitates the positioning of the thumb of the rider 100 to apply a force on the surface 807. The recess 809 has a curvature generally complementary to the curvature of the handlebar 36 thereby allowing the portion 805 to be positioned in proximity to the handlebar 36 while allowing the lever 702 to be pivoted toward the handlebar 36 when actuated. The bottom portion 806 forms a u-shape. The bottom portion 806 comprises openings 813 and 815 defining the pivot axis 808. A cable end 717 of the cable 816 is removably connected to the bottom portion 806.

The housing 810 comprises a top portion 812 and a bottom portion 811 formed from steel, aluminum or plastic. It is contemplated that the top and bottom portions 812, 811 could be made of other materials. The top portion 812 and the bottom portion 811 are removably attached together by one or more screws. The top portion 812 comprises an inner diameter 818. The bottom portion 811 comprises two portions 817 and 819 extending generally perpendicularly with respect to one another. The portion 817 extends longitudinally along the axis 780. The portion 817 comprises an inner diameter 821 and two openings 822 and 823. The inner diameters 818 and 821 are adapted to receive the tubular handlebar 36 so that the housing 810 can be tightened to the handlebar 36 for example with a screw or a combination of a bolt and a nut. The two opening 822 and 823 are complementary to the openings 813 and 815. The portion 819 comprises a sleeve 824 in which the cable sheath 716 is inserted.

Figure 10:
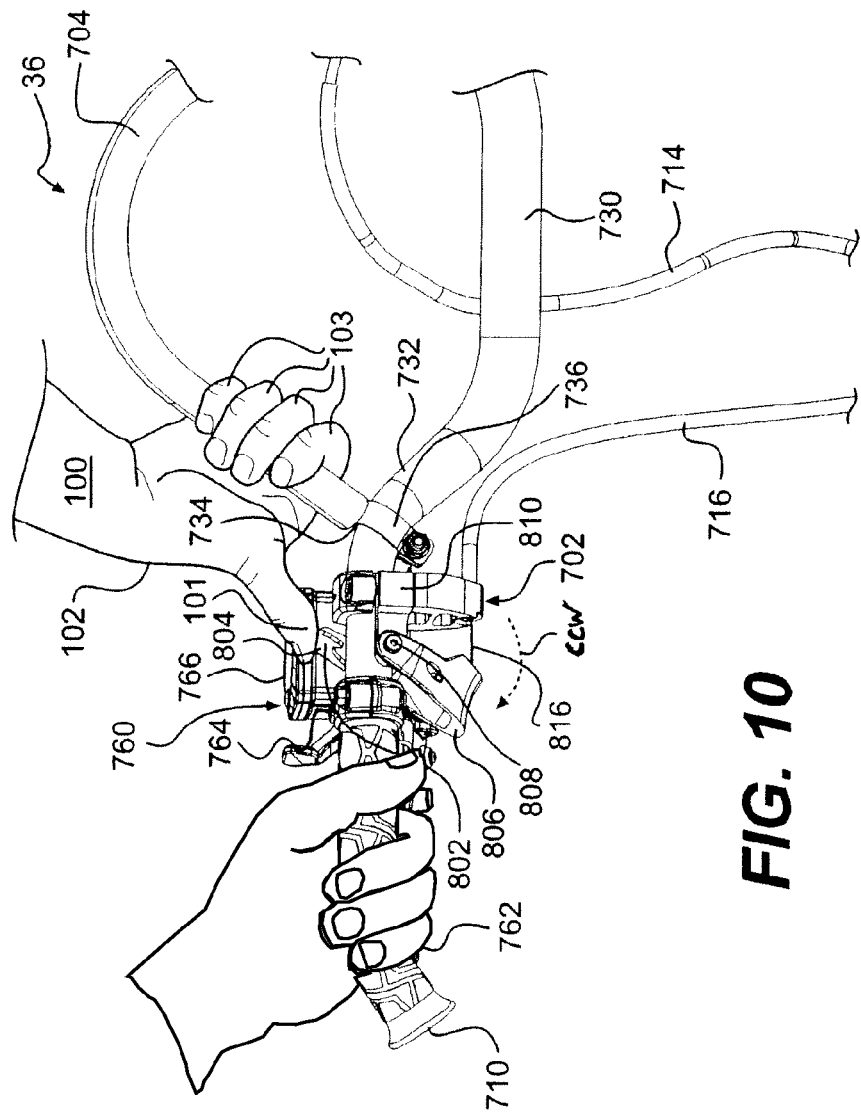
FIG. 10 is a rear, left perspective view of a portion of the handlebar assembly of FIG. 7 showing a user actuating the left throttle lever with his right hand.

FIG. 10 shows the left throttle lever assembly 702 installed on the handlebar 36 and actuated by a right thumb 101 of the rider 100 of the snowmobile 10. The rider 100 grabs the mountain strap 704 with fingers 103 of the right hand 102 and pivots the lever 802 toward the mountain strap 704 with the thumb 101. Upon actuation by the rider 100, the top portion 804 and the bottom portion 806 pivots in a counter-clockwise direction CCW thereby translating the cable 816 outwardly.

It is contemplated that the snowmobile 10 could be provided with an alternative embodiment of the handlebar assembly being a mirror image of the one described above. In such an embodiment, both throttle levers would extend toward the left of the snowmobile 10 and the right throttle lever would be arranged so as to be actuated by a left thumb of the driver when the left hand of the driver is holding the mountain strap 704.

Figure 11:
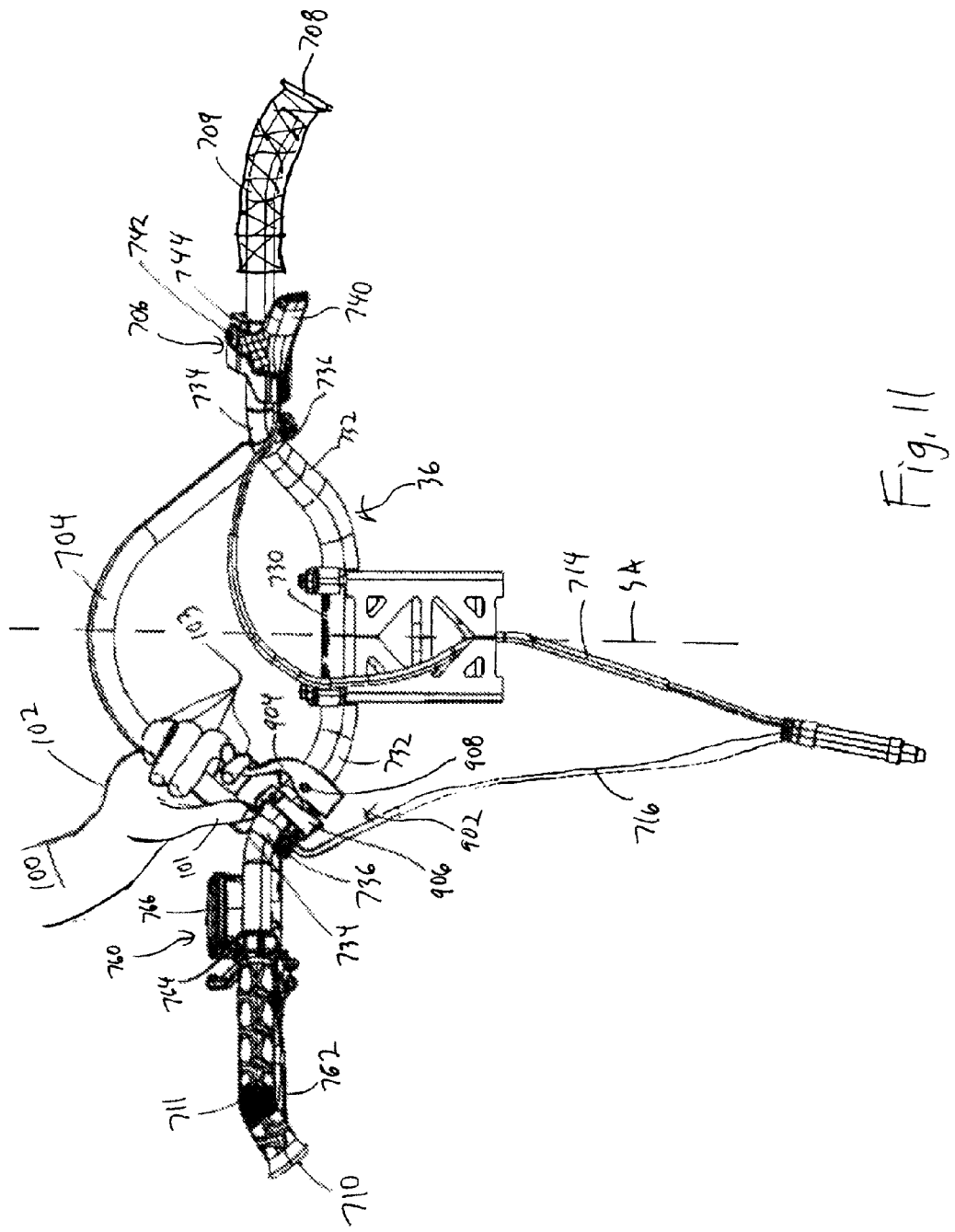
FIG. 11 is a rear perspective view of a handlebar assembly having an alternative embodiment of a left throttle lever assembly showing a user actuating the left throttle lever with his right hand.

Turning now to FIG. 11, a handlebar assembly having a left throttle lever assembly 902 that is an alternative embodiment of the left throttle lever assembly 702 will be described. For simplicity, features of the throttle lever assembly 902 that are similar to those of the throttle lever assembly 702 have been labelled with the same reference numerals and will not be described again.

As can been seen, the left throttle lever assembly 902 is disposed on the left portion 732 of the handlebar 36 between the left collar 736 and the steering axis SA. As such, the left throttle lever assembly is disposed laterally between the mountain strap 704 and the steering axis SA. The left throttle lever assembly 902 has a lever 904 pivotably connected to the handlebar 36 by a housing 906. The lever 904 pivots about a pivot axis 908. The lever 904 is normally biased away from the handlebar 36 by a spring or other biasing means. The lever 904 pivots toward the mountain strap 704 and toward the left side of the snowmobile 10 (i.e. in a clockwise direction) upon applying a force toward the mountain strap 704.

To actuate the left throttle lever assembly 902, the rider 100 grabs the mountain strap 704 with the right hand 102 while actuating the left throttle lever assembly 902 with at least one finger 103 of the right hand 102. Because the rider 100 can grab both the mountain strap 704 and actuate the left throttle lever assembly 902 with the right hand 102, the left hand 104 remains free to actuate the brake assembly 760 when required.

Figure 12:
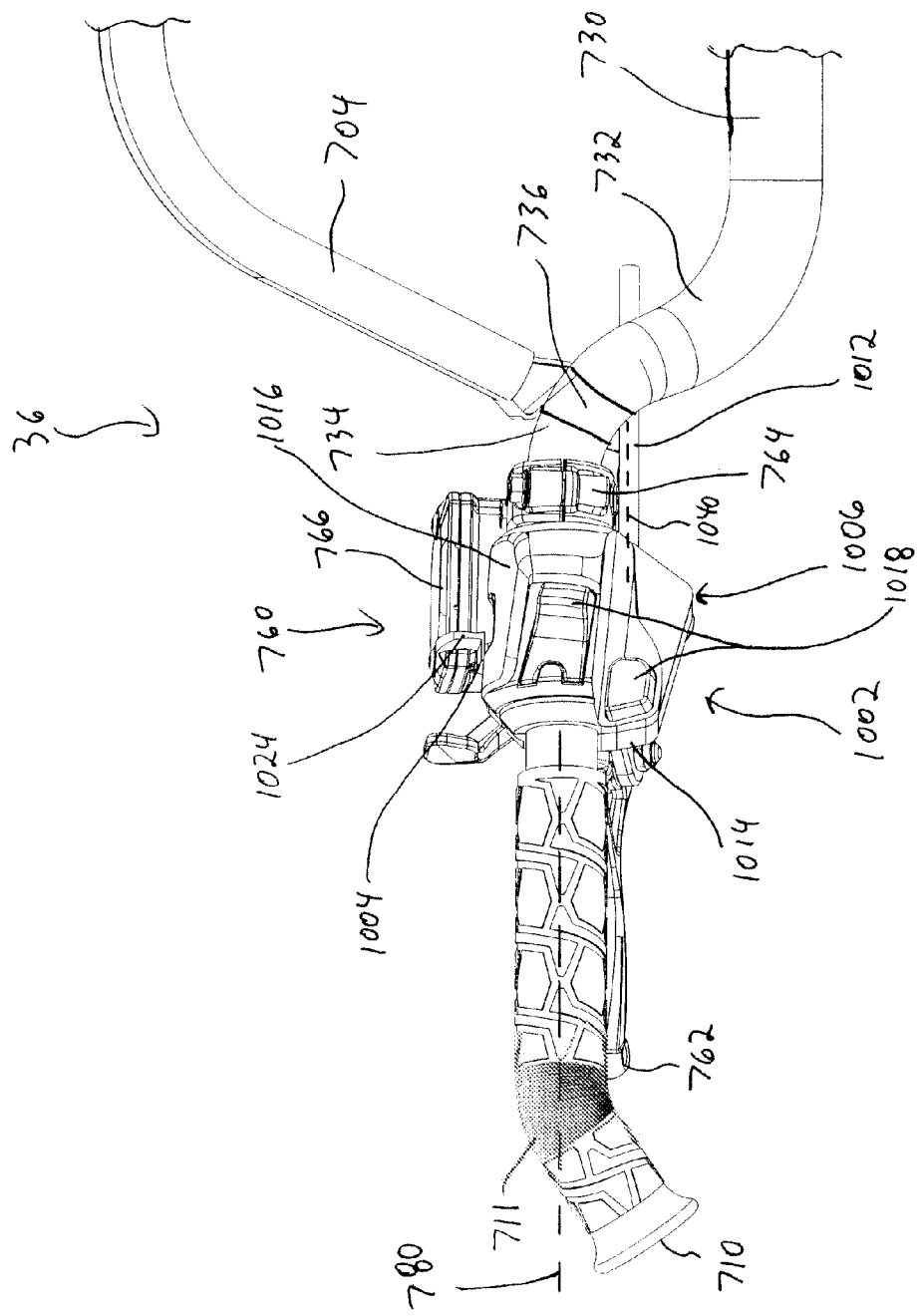
FIG. 12 is a rear perspective view of a left portion of a handlebar assembly having another alternative embodiment of a left throttle lever assembly.
Figure 13:
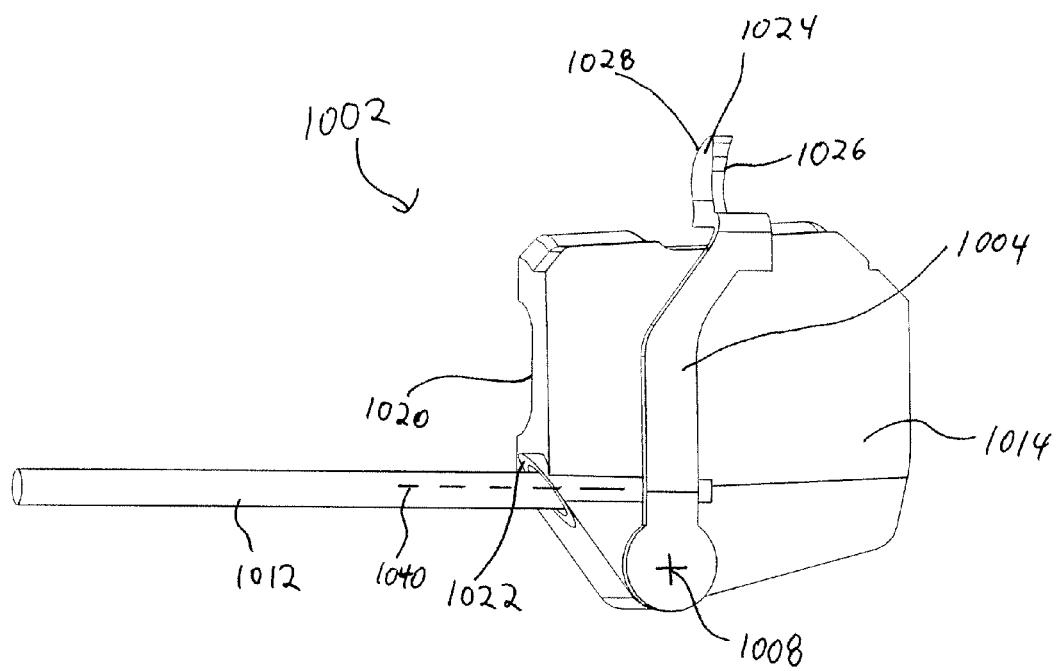
FIG. 13 is a front perspective view of a front portion of a housing of the left throttle lever assembly of FIG. 12.
Figure 14:
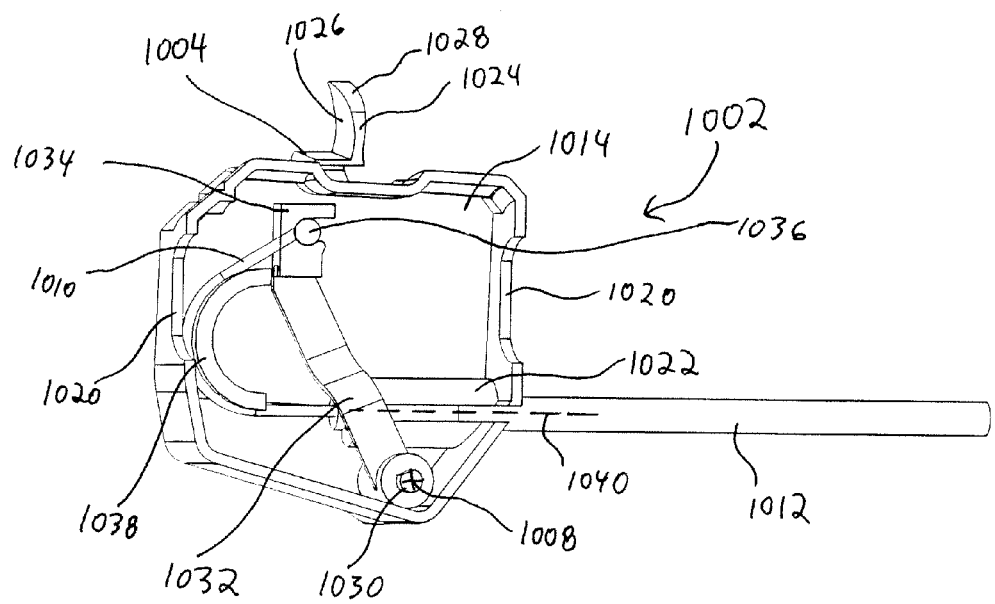
FIG. 14 is a rear perspective view of the front portion of the housing of the left throttle lever assembly of FIG. 13.

Turning now to FIGS. 12 to 14, a handlebar assembly having a left throttle lever assembly 1002 that is an alternative embodiment of the left throttle lever assembly 702 will be described. For simplicity, features of the throttle lever assembly 1002 that are similar to those of the throttle lever assembly 702 have been labelled with the same reference numerals and will not be described again.

The left throttle lever assembly 1002 is connected to the handlebar 36, between the grip portion 711 and the left collar 736 of the mountain strap 704. The left throttle lever assembly 1002 has a lever 1004 pivotably connected to the handlebar 36 by a housing 1006. The lever 1004 pivots about a pivot axis 1008 (see FIGS. 13 and 14). The lever 1004 is normally biased away from the handlebar 36 toward the position shown in FIG. 12 by a spring or other biasing means (not shown). The lever 1004 pivots toward the mountain strap 704 and toward the right side of the snowmobile 10 (i.e. in a counter-clockwise direction) upon applying a force toward the handlebar 36. As such the lever 1004 of the lever assembly 1002 is actuated in the same manner as the lever 802 of the lever assembly 702. The lever 1004 extends generally vertically above a central axis 780 of the grip portion 711 and generally parallel to the mountain strap 704. It is also contemplated that the lever 1004 can be disposed rearwardly or forwardly of the handlebar 36 to match other possible positions of the mountain strap 704. The lever 1004 is operatively connected to a first end of a cable 1010 (FIG. 14) as will be described in greater detail below. A second end of the cable 1010 is operatively connected to the air flow control mechanism 720. The housing 1006 is connected to a first end of a cable sheath 1012 inside which the cable 1010 translates upon actuation of the lever 1004. A second end of the cable sheath 1012 is connected to the air flow control mechanism 720. As can be seen in FIG. 12, the cable sheath 1012 is routed in front of the handlebar 36.

Although, a second end of the cable 1010 connected to the air flow control mechanism 720 is depicted, it also contemplated that the second end of the cable 1010 could alternatively be connected to the right throttle lever assembly 706 such that both throttle lever assemblies are actuated together or to the cable connected to the right throttle lever 706.

The housing 1006 comprises a front portion 1014 and a rear portion 1016 formed from steel, aluminum or plastic. It is contemplated that the front and rear portions 1014, 1016 could be made of other materials. The front portion 1014 and the rear portion 1016 are removably attached together by clips or one or more screws (not shown). The rear portion 1016 has buttons and levers 1018 to be actuated by the rider 100 to control one or more elements of the snowmobile 10. The lever 1004 is pivotally connected to the front portion 1014 as will be described below. The front portion 1014 has recesses 1020 (FIG. 14). The rear portion 1016 has corresponding recesses (not shown). The tubular handlebar 36 is received inside these recesses. As explained below, the portion 1014 comprises a sleeve 1022 in which the cable sheath 1012 is inserted.

The lever 1004 extends along a front of the portion 1014 of the housing 1006. The lever 1004 has a portion 1024 which extends generally perpendicularly to the handlebar 36 when installed on the snowmobile 10. The portion 1024 of the lever 1004 comprises a surface 1026 adapted for actuation of the lever 1004 by a right thumb of the rider 100. The portion 1024 of the lever 1004 also comprises a bevelled edge 1028. The bevelled edge 1028 facilitates the positioning of the thumb of the rider 100 to apply a force on the surface 1026. The lever 1004 is pivotably and removably connected to the portion 1014 of the housing 1006 by a fastener 1030. A lever 1032 is disposed inside the portion 1014 of the housing 1006. The lever 1032 is connected at one end to the lever 1004 so as to pivot together with the lever 1004 about the pivot axis 1008. The other end of the lever 1032 is connected to a hook 1034. A cable end 1036 of the cable 1010 is received in the hook 1034. From the cable end 1036, the cable 1010 is wrapped around a semi-circular surface 1038 such that when the rider 100 presses on the surface 1026, the hook 1034 pulls on the cable 1010. The semi-circular surface 1038 is integrally formed with the portion 1014 of the housing 1006. It is contemplated that the semi-circular surface 1038 could alternatively be bonded, fastened or otherwise connected to the portion 1014 of the housing 1006. As previously mentioned, the cable 1010 enter the sheath 1012 which is inserted in the sleeve 1022 formed in the portion 1014 of the housing 1006. The longitudinal axis 1040 of the sleeve 1022 is generally parallel to the central axis 780 of the grip portion 711.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A snowmobile comprising:
a frame, the frame including:
  an engine compartment; and
  a tunnel rearward of the engine compartment;
an endless drive track disposed below the tunnel for propelling the snowmobile;
at least one ski operatively connected to the frame;
an engine disposed in the engine compartment, the engine being operatively connected to the endless drive track;
a handlebar operatively connected to the at least one ski, the handlebar being pivotable about a steering axis;
a mountain strap connected to the handlebar;

a first throttle lever pivotably connected to the handlebar and operatively connected to the engine, the first throttle lever being disposed on a first side of the steering axis, the first throttle lever being normally biased away from the handlebar to a first throttle lever normally biased position, the first throttle lever being pivotable toward the handlebar away from the first throttle lever normally biased position; and a second throttle lever pivotably connected to the handlebar and operatively connected to the engine, the second throttle lever being disposed on a second side of the steering axis, the second throttle lever being normally biased away from the handlebar to a second throttle lever normally biased position, the second throttle lever being pivotable toward the mountain strap away from the second throttle lever normally biased position, the mountain strap having a first end connected to the handlebar between the steering axis and the first throttle lever and a second end connected to the handlebar on the second side of the steering axis.

2. The snowmobile of claim 1, wherein the second throttle lever is disposed adjacent to the mountain strap such that when a hand of a user of the snowmobile grasps the mountain strap the hand of the user is in a position to pivot the second throttle lever toward the mountain strap.

3. The snowmobile of claim 1, wherein the first throttle lever is a right throttle lever and the second throttle lever is a left throttle lever.

4. The snowmobile of claim 1, wherein the handlebar further comprises grip portions disposed on the first and second sides of the steering axis.

5. The snowmobile of claim 4, wherein the second throttle lever and the mountain strap extend vertically above central axes of the grip portions.

6. The snowmobile of claim 4, wherein the second throttle lever and the mountain strap extend rearwardly with respect to a vertical plane crossing a central axis of the grip portion disposed on the second side of the steering axis.

7. The snowmobile of claim 4, wherein the second throttle lever comprises:
a first portion extending vertically above a central axis of the grip portion disposed on the second side of the steering axis, the first portion comprising a surface adapted for applying a force to move the second throttle lever; and
a second portion extending vertically below the central axis of the grip portion disposed on the second side of the steering axis, the second portion being operatively connected to a cable, the cable being operatively connected to a throttle body, the throttle body fluidly communicating with the engine.

8. The snowmobile of claim 2, wherein the second end of the mountain strap is disposed between the second throttle lever and the steering axis.

9. The snowmobile of claim 2, wherein the second throttle lever is disposed between the second end of the mountain strap and the steering axis.

10. A snowmobile comprising:
a frame, the frame including:
an engine compartment; and
a tunnel rearward of the engine compartment;
an endless drive track disposed below the tunnel for propelling the snowmobile;
at least one ski operatively connected to the frame;
an engine disposed in the engine compartment, the engine being operatively connected to the endless drive track;
a handlebar operatively connected to the at least one ski, the handlebar being pivotable about a steering axis;
a first throttle lever pivotably connected to the handlebar and operatively connected to the engine, the first throttle lever being disposed on a first side of the steering axis, the first throttle lever being pivotable toward the handlebar by pivoting the first throttle lever in a first direction, the first throttle lever being normally biased in a second direction opposite the first direction away from the handlebar; and
a second throttle lever pivotably connected to the handlebar and operatively connected to the engine, the second throttle lever being disposed on a second side of the steering axis, the second throttle lever being pivotable toward the handlebar by pivoting the second throttle lever in the first direction, the second throttle lever being normally biased in the second direction away from the handlebar.

11. The snowmobile of claim 10, wherein the first direction is a counter-clockwise direction.

12. The snowmobile of claim 10, further comprising a mountain strap connected to the handlebar.

13. The snowmobile of claim 12, wherein the second throttle lever is disposed adjacent to the mountain strap such that when a hand of a user of the snowmobile grasps the mountain strap the hand of the user is in a position to pivot the second throttle lever toward the mountain strap.

14. The snowmobile of claim 10, wherein the first throttle lever is a right throttle lever and the second throttle lever is a left throttle lever.

15. The snowmobile of claim 12, wherein the handlebar further comprises grip portions disposed on the first and second sides of the steering axis.

16. The snowmobile of claim 15, wherein the second throttle lever and the mountain strap extend vertically above a central axis of the grip portion disposed on the second side of the steering axis.

17. The snowmobile of claim 15, wherein the second throttle lever and the mountain strap extend rearwardly with respect to a vertical plane crossing a central axis of the grip portion disposed on the second side of the steering axis.

18. The snowmobile of claim 15, wherein the second throttle lever comprises:
a first portion extending vertically above a central axis of the grip portion disposed on the second side of the steering axis, the first portion comprising a surface on which a user of the snowmobile applies a force to pivot the second throttle levers; and
a second portion extending vertically below the central axis of the grip portion disposed on the second side of the steering axis, the second portion being operatively connected to a cable, the cable being operatively connected to a throttle body, the throttle body fluidly communicating with the engine.

19. A throttle lever assembly comprising:
a housing having an opening adapted for receiving a handlebar of a vehicle, the opening defining a central axis, the handlebar of the vehicle which the opening of the housing is adapted to receive having a mountain strap connected thereto; and
a throttle lever pivotally connected to the housing, the throttle lever being movable between a first position and a second position, the throttle lever being normally biased toward the first position, the throttle lever comprising a surface adapted for at least one finger of a hand of a user to apply a force to move the throttle lever toward the second position, the surface being perpendicular to the central axis when the throttle lever is in the first position, the throttle lever being adapted to be pivoted toward the mountain strap using the at least one finger of the user while a hand of the user having the at least one finger is grabbing the mountain strap.

20. The throttle lever assembly of claim 19, wherein the throttle lever comprises:
   a first portion extending from a first side of the central axis, the first portion comprising the surface; and
   a second portion extending from a second side of the central axis, the second side being opposite to the first side, the second portion being adapted for connection to a throttle body fluidly communicating with an engine of the vehicle.

21. The throttle lever assembly of claim 20, wherein the first portion further comprises a recess adapted to receive a portion of the handlebar.

22. The throttle lever assembly of claim 20, wherein the first portion further comprises a bevelled edge.

23. A method of driving a snowmobile comprising:
   grabbing a left end of a handlebar of the snowmobile with a left hand, the handlebar being operatively connected to at least one ski of the snowmobile and being pivotable about a steering axis;
   grabbing a right end of the handlebar with a right hand;
   actuating a first throttle lever using at least one finger of the right hand while grabbing the right end of the handlebar with the right hand, the first throttle lever being connected to the handlebar on a right side of the steering axis;
   releasing the right hand from the right end of the handle bar;
   grabbing a left end of a mountain strap with the right hand, the mountain strap being connected to the handlebar, the left end of the mountain strap being disposed on a left side of the steering axis; and
   actuating a second throttle lever using at least one finger of the right hand while grabbing the left end of the mountain strap with the right hand, the second throttle lever being connected to the handlebar on the left side of the steering axis.

24. The method of claim 23, wherein actuating the second throttle lever using at least one finger of the right hand includes actuating the second throttle lever using a thumb of the right hand.

25. The method of claim 23, further comprising actuating a lever of a brake control assembly using at least one finger of the left hand while grabbing the left end of the handlebar with the left hand, the lever of the brake control assembly being connected to the handlebar on a left side of the steering axis.

* * * * *